(12) United States Patent
Ferron et al.

(10) Patent No.: US 8,956,582 B2
(45) Date of Patent: Feb. 17, 2015

(54) RHENIUM RECOVERY

(75) Inventors: Cesare G. Ferron, Peterborough (CA); Larry E. Seeley, Lakefield (CA)

(73) Assignee: Maritime House Metals Inc. (CA)

( * ) Notice: Subject to any disclaimer, the term of this patent is extended or adjusted under 35 U.S.C. 154(b) by 194 days.

(21) Appl. No.: 13/255,541

(22) PCT Filed: Mar. 11, 2010

(86) PCT No.: PCT/CA2010/000333
§ 371 (c)(1),
(2), (4) Date: Nov. 23, 2011

(87) PCT Pub. No.: WO2010/102391
PCT Pub. Date: Sep. 16, 2010

(65) Prior Publication Data
US 2012/0058029 A1    Mar. 8, 2012

Related U.S. Application Data

(60) Provisional application No. 61/159,883, filed on Mar. 13, 2009.

(51) Int. Cl.
| | |
|---|---|
| C01G 45/00 | (2006.01) |
| C22B 47/00 | (2006.01) |
| C22B 61/00 | (2006.01) |
| C22B 3/06 | (2006.01) |
| C22B 3/10 | (2006.01) |
| C22B 3/42 | (2006.01) |
| C22B 3/44 | (2006.01) |
| C22B 7/00 | (2006.01) |
| C01G 47/00 | (2006.01) |
| C22B 11/02 | (2006.01) |

(52) U.S. Cl.
CPC ............... C22B 61/00 (2013.01); *C01G 47/00* (2013.01); *C22B 11/021* (2013.01); C22B 3/065 (2013.01); C22B 3/10 (2013.01); C22B 3/42 (2013.01); C22B 3/44 (2013.01); C22B 7/007 (2013.01)
USPC ........................................................ 423/49

(58) Field of Classification Search
None
See application file for complete search history.

(56) References Cited

U.S. PATENT DOCUMENTS

| | | | |
|---|---|---|---|
| 2,876,065 A | 3/1959 | Zimmerley | |
| 3,558,268 A | 1/1971 | Prater et al. | |
| 3,578,395 A * | 5/1971 | Kluksdahl et al. | ............ 502/262 |
| 3,709,681 A * | 1/1973 | Wilson | ........................ 75/722 |
| 3,725,524 A | 4/1973 | Martin et al. | |
| 3,739,057 A | 6/1973 | Daugherty et al. | |
| 3,739,549 A | 6/1973 | Hevia et al. | |
| 3,755,104 A | 8/1973 | Kruesi | |
| 3,770,414 A | 11/1973 | Lake et al. | |
| 3,855,385 A | 12/1974 | Derosset et al. | |
| 3,856,915 A | 12/1974 | Pagnozzi et al. | |
| 3,862,292 A | 1/1975 | Bauer et al. | |
| 3,870,779 A | 3/1975 | Wright et al. | |
| 3,884,799 A | 5/1975 | Mahoney et al. | |
| 3,894,866 A | 7/1975 | Richards et al. | |
| 3,932,579 A | 1/1976 | Morgan | |
| 4,006,212 A | 2/1977 | Alper et al. | |
| 4,049,771 A | 9/1977 | Quatrini et al. | |
| 4,185,078 A | 1/1980 | Quatrini et al. | |
| 4,278,641 A | 7/1981 | Petrov et al. | |
| 4,321,089 A | 3/1982 | Kruesi et al. | |
| 4,521,381 A * | 6/1985 | Douglas et al. | ................. 423/49 |
| 4,557,906 A | 12/1985 | Douglas et al. | |
| 4,572,823 A | 2/1986 | Ogata et al. | |
| 4,584,185 A | 4/1986 | Douglas et al. | |
| 4,599,222 A | 7/1986 | Douglas et al. | |
| 4,599,223 A * | 7/1986 | Douglas et al. | ................. 423/49 |
| 4,604,265 A | 8/1986 | Douglas et al. | |
| 5,562,817 A | 10/1996 | Mon et al. | |
| 6,936,090 B2 | 8/2005 | Meese-Marktscheffel et al. | |
| 7,166,145 B1 | 1/2007 | Han | |
| 2003/0119658 A1 | 6/2003 | Allison et al. | |
| 2003/0136685 A1 * | 7/2003 | Stoller et al. | ................... 205/717 |
| 2003/0206823 A1 | 11/2003 | Adams | |
| 2009/0038441 A1 | 2/2009 | McKenna | |
| 2009/0223325 A1 * | 9/2009 | Mauldin | .......................... 75/401 |
| 2009/0255372 A1 * | 10/2009 | Olbrich et al. | ............... 75/10.67 |
| 2009/0277305 A1 * | 11/2009 | Rizkalla et al. | .................. 75/711 |
| 2011/0229366 A1 * | 9/2011 | Luederitz et al. | ............. 420/433 |

FOREIGN PATENT DOCUMENTS

| | | |
|---|---|---|
| GB | 679546 | 9/1952 |
| GB | 1453225 | 10/1976 |

(Continued)

OTHER PUBLICATIONS

Handbook of Chemistry and Physics, Electrochemical Series, 5-80 to 5-89 (2013).*

(Continued)

*Primary Examiner* — Melissa Swain
(74) *Attorney, Agent, or Firm* — Barnes & Thornburg LLP

(57) ABSTRACT

There is provided a hydrometallurgical process of recovering rhenium values from mixtures thereof with other metal values in which the rhenium values constitute a minority amount, for example super-alloys, which comprises subjecting the mixture to strongly oxidizing acid conditions, preferably an aqueous mixture of hydrochloric acid and nitric acid, so as to form perrhenate species of at least the major proportion of the rhenium values in the mixture, dissolving the perrhenate species and other soluble metal species in aqueous solution, removing insoluble metal species from the aqueous solution, and isolating the rhenium species from the solution.

9 Claims, No Drawings

(56) References Cited

FOREIGN PATENT DOCUMENTS

| | | | | |
|---|---|---|---|---|
| JP | 01070135 | A | * | 3/1989 |
| JP | 07145427 | A | * | 6/1995 |
| RU | 2092598 | C1 | * | 10/1997 |
| RU | 2412267 | C1 | * | 2/2011 |
| WO | WO 2007/099365 | | | 9/2007 |

OTHER PUBLICATIONS

Int'l Search Report issued in PCT/CA2010/000333 (2010).
Int'l Preliminary Report on Patentability (IPRP) issued in PCT/CA2010/000333 (2011).
International Search Report and the Written Opinion issued in PCT/US2011/000437.

* cited by examiner

RHENIUM RECOVERY

RELATED APPLICATION

The present application is a U.S. nationalization under 35 U.S.C. §371 of International Application No. PCT/CA2010/000333, filed Mar. 11, 2010, which claims benefit of priority to U.S. Provisional Patent Application No. 61/159,883, filed Mar. 13, 2009, entitled "RHENIUM RECOVERY". The disclosures set forth in the referenced patent applications are incorporated herein by reference in their entireties, including all information as originally submitted to the U.S. Patent and Trademark Office.

FIELD OF THE DISCLOSURE

This disclosure relates to rhenium and rhenium compounds. More specifically, it relates to processes for extracting rhenium and rhenium compounds from compositions containing rhenium and rhenium compounds along with other metals and metal compounds, for example alloys, super-alloys, ores and metallurgical residues.

BACKGROUND OF THE DISCLOSURE

Rhenium (Re) is a rare, greyish-white, heavy, poly-valent transition metal, of atomic number 75 and atomic weight 186.2. In its chemical properties, it resembles manganese. It is extremely dense. It has a very high melting point (3186° C.); a property which leads to its use in high temperature resistant alloys, especially nickel-based superalloys used in jet aircraft engine parts such as turbine blades, and in blades for gas turbine generators. Rhenium confers both high temperature resistance and corrosion resistance on the alloys. A typical such alloy contains 2 to 6% by weight rhenium, along with a major proportion (50 to 60%) nickel and minor amounts of one or more of cobalt, chromium, aluminum, molybdenum, tantalum and tungsten (e.g. 2 to 10% of each).

Rhenium is also used, to a lesser extent, in catalysts for making lead-free, high octane gasoline, typically in conjunction with platinum.

There is a wide range of oxidation states of rhenium, the widest range of any known element. The known oxidation states are $-3$, $-1$, $0$, $+1$, $+2$, $+3$, $+4$, $+5$, $+6$ and $+7$, with oxidation states $+7$, $+6$, $+4$, $+2$ and $-1$ being the most common. The major commercial source of rhenium is as a minor constituent (up to 0.2%) in the mineral molybdenite. It is extracted from molybdenite roaster-flue gas, by leaching, in the form of its water soluble oxides.

Rhenium is extremely expensive—among the ten most expensive metals known. At times, its price exceeds $10,000 per kilogram. As a result, recovery of the rhenium content of used alloys, e.g. from worn-out aircraft turbines and from other rhenium-containing compounds, is desirable.

BRIEF REFERENCE TO THE PRIOR ART

Currently, processes for recovery of rhenium from alloys and mixtures thereof containing nickel and cobalt involve electro-dissolution and hydrochloric acid or sulfuric acid leaching of the cobalt and nickel values. With respect to electro-dissolution, an electric current is applied, for example, to a liquid hydrochloric acid aqueous solution of the metals, to cause the formation of oxides, then chlorides, of nickel and cobalt, which dissolve in the aqueous medium, leaving most of the rhenium and other metals present in minor quantities (molybdenum, tantalum, tungsten, for example) in the solid phase. In one process, chunks of the alloy to be treated are contained in a titanium basket which is suspended in a bath of hydrochloric acid. The basket is made the anode, and a cathode, e.g. of titanium, is added to the bath, a current being passed between them. Rhenium, along with molybdenum, tantalum and other refractory metals, remain in the solid phase. The rhenium can be recovered from this solid mixture by pyrometallurgical techniques—roasting with oxygen to high temperatures (normally over 400° C.) in a kiln to vaporize the rhenium and then recovering it from the gas phase, with the other metals of higher vaporization temperatures remaining in the solid phase.

With respect the direct acid attack of rhenium (Re) super-alloy, a major problem with hydrochloric acid and sulfuric acid leaching processes is the generation of large quantities of hydrogen gas, in the reaction of the nickel and cobalt values with the acid. This requires that the process be conducted with great care, in expensive facilities, to minimize the risk of explosions.

The present disclosure seeks to provide a new process for recovery of rhenium and rhenium compounds, which largely avoids such disadvantages.

SUMMARY OF THE DISCLOSURE

The following presents a simplified summary of the general inventive concept herein to provide a basic understanding of some aspects of the disclosure. This summary is not an extensive overview of the disclosure. It is not intended to restrict key or critical elements of the disclosure or to delineate the scope of the disclosure beyond that explicitly or implicitly described by the following description and claims.

The present disclosure provides a hydrometallurgical rhenium and rhenium compound recovery process which involves converting the rhenium values in mixtures with other metals and metal compounds to their highest oxidative valence state, $+7$, in which it is soluble in water. An aqueous solution is formed in which the rhenium, commonly in the form of perrhenic acid $HReO_4$, dissolves in the aqueous phase, along with other metals such as nickel and cobalt in soluble salt form, whereas other contaminating metals such as tantalum and tungsten used in superalloys remain in the solid phase. These can be removed by filtration.

Separation of the rhenium values from the cobalt and nickel values, and other trace metal residues, in the solution so obtained, can be done by any one of a number of known hydrometallurgical processes. Thus according to the present disclosure, from one aspect, there is provided a hydrometallurgical process of recovering rhenium values from mixtures thereof with other metal values in which the rhenium values constitute a minority amount, which comprises subjecting the mixture to strongly acidic oxidizing conditions so as to form perrhenate species of at least the major proportion of the rhenium values in the mixture, dissolving the perrhenate species and other soluble metal species in aqueous solution, removing insoluble metal species from the aqueous solution, and isolating the rhenium species from the solution.

In some exemplary embodiments, the strongly oxidizing acid conditions are provided by an oxidizing acid solution having a redox potential of at least 500 mv vs. Ag/AgCl. In other exemplary embodiments, the strongly oxidizing acid conditions are provided by an oxidizing acid solution having a redox potential of at least 750 mv vs. Ag/AgCl.

In some exemplary embodiments, the oxidizing acid solution includes at least a small amount chloride ion.

In some exemplary embodiments of the process the strongly oxidizing acid conditions are constituted by a mixture of nitric acid and hydrochloric acid. The hydrochloric acid to nitric acid (v/v) in such exemplary embodiments may be provided, on a concentrated acid basis, from about 1:3 to about 10:1. Furthermore, the hydrochloric acid, in some exemplary embodiments, may constitute a major portion of the acid mixture.

In some exemplary embodiments, the mixture of rhenium values with other metal values is provided as a rhenium containing super-alloy, a rhenium containing metallurgical residue, a rhenium containing ore and/or a mixture of rhenium-containing solids.

In some exemplary embodiments, the mixture of rhenium values with other metal values is provided in a finely divided particulate form and is subjected to the strongly oxidizing acid conditions at temperatures of from about 30° C. to about 80° C., preferably from about 60° C. to about 80° C., and for a time period of from about 1 hour to about 6 hours. Furthermore, the finely divided particulate mixture, in some exemplary embodiments has a particle size range of approximately 2 microns to 300 microns, whereas in other exemplary embodiments, the finely divided particulate mixture has a size range of approximately range 20 microns to 200 microns.

In still other exemplary embodiments, the mixture of rhenium values with other metal values is provided as large pieces and is subjected to the strongly oxidizing acid conditions at temperatures of from about 40° C. to about 80° C. for a time period of from about 2 days to about 10 days. Furthermore, in some exemplary embodiments, the large pieces have a length of from about 2 inches to about 5 inches and an average cross-sectional dimension of about ½ of an inch. In some exemplary embodiments, the large pieces may have a volume of about 20 cm$^3$ to about 100 cm$^3$.

In some exemplary embodiments, the rhenium-containing solids mixture content subjected to the oxidizing acid solution is from about 5% to about 20%. Furthermore, in some exemplary embodiments, the rhenium-containing solids mixture content subjected to the oxidizing acid solution is from about 10% to about 15%. Also, in some exemplary embodiments, the rhenium-containing solids mixture may be subjected to the strongly oxidizing acids conditions at atmospheric pressure.

In some exemplary embodiments, the rhenium species is separated from the resultant aqueous solution by sulfide precipitation of $Re_2S_7$, by absorption on activated carbon, by absorption on absorbent resin, or by solvent extraction. In other exemplary embodiments, the rhenium species is separated from the resultant aqueous solution as solid ammonium perrhenate $NH_4ReO_4$.

In some exemplary embodiments gases generated from the process contain nitrogen oxides and are collected. The nitrogen oxide-containing gases, in some exemplary embodiments, are mixed with oxygen, hydrogen peroxide or atmospheric air so as to react with the nitrogen oxides and form nitric acid in situ.

In another exemplary embodiment, there is provided a hydrometallurgical process of recovering rhenium values from mixtures thereof with other metal values in which the rhenium values constitute a minority amount. The process comprises subjecting the mixture to strongly oxidizing aqueous acid conditions so as to form an aqueous solution of perrhenate species of at least a major proportion of the rhenium values in the mixture along with other soluble metal species, removing insoluble metal species from the aqueous solution, and separating the rhenium species from the solution.

DETAILED DESCRIPTION

Oxidation of the rhenium in the mixture to valence state +7 to form perrhenate is preferably conducted using an oxidizing acid such as nitric acid, Caro's acid (sulfuric acid plus peroxide), chlorine/hydrochloric acid mixtures (with the gaseous chlorine being fed through the liquid and "mopping up" generated hydrogen), sulfuric acid/hypochlorite mixtures, or other acids in admixture with peroxide. Presence of chloride ion, even in small amounts, for example at about a 1M concentration, appears to be beneficial and is preferred.

Especially preferred as oxidizing acid is a mixture of nitric acid and hydrochloric acid, relative proportions of which are adjusted based upon efficiency and economic considerations. Nitric acid is relatively expensive. Moreover, the more nitric is used, the more oxides of nitrogen are generated, and these are expensive to scrub out to meet environmental standards. Replacement of a portion of the nitric acid with hydrochloric acid improves the economics of the process while retaining its efficiency. Under these strongly corrosive conditions, special acid-resistant vessels or vessel linings, such as glass and ceramics, need to be used, which adds somewhat to the cost of the process The best balance of economic operation and efficient rhenium extraction is obtained by leaching with nitric acid-hydrochloric acid aqueous mixtures with ratios of $HCl/HNO_3$ in the range 1:3 to 10:1 (v/v). Most preferred are ratios in which the hydrochloric acid predominates. These figures are based on use of fully concentrated commercial acids, which in the case of concentrated hydrochloric acid is 37% HCl and in the case of concentrated nitric acid is 70% $HNO_3$, as is well known.

A further beneficial feature of the process of the disclosure is that it can be conducted at atmospheric pressure, which also adds to its economic advantages.

In the preferred process of the disclosure using nitric/hydrochloric acid mixtures, the rhenium values, as perrhenate, dissolve in the aqueous acidic medium, along with any chromium, nickel, cobalt and aluminum, other common constituents of super-alloys. The tungsten and tantalum constituents do not dissolve, and can readily be removed, e.g. by filtration or centrifugation. At least the following reactions are believed to take place in the acid oxidizing leaching step:

$$3Ni+2HNO_3+6HCl \rightarrow 3NiCl_2+2NO+4H_2O$$

$$3Co+2HNO_3+6HCl \rightarrow 3CoCl_2+2NO+4H_2O$$

It is to be noted that under these strongly oxidizing conditions, no significant amount of hydrogen is generated. Moreover, under these same strongly oxidizing conditions, rhenium is oxidized to the +7 stage and solubilized as perrhenate, thus:

$$3Re+7HNO_3 \rightarrow 3HReO_4+7NO+2H_2O$$

Again, no hydrogen is generated in this reaction.

At the end of the leach, not only the nickel and cobalt but also the rheniums are found dissolved in solution. After filtration of the unleached material from the starting solid (which in the case of super-alloy recovery contains mostly tantalum and tungsten), the resultant leach solution can be treated to recover the rhenium species in it. A typical such leach solution from a super-alloy could contain, for example, 50 to 80 g/L Ni, 5 to 10 g/L Co and 1 to 3 g/L Re, plus other metals such as Al, Cr and Mo.

The Re species in such solution can be recovered by any of several methods known to those of skill in the art. One such method is sulfide precipitation of $Re_2S_7$, described in U.S. Pat. No. 2,876,065. Another is adsorption on activated carbon, described in U.S. Pat. No. 3,862,292, or separation by the appropriate resin or solvent. Still another is precipitation of the base metals and filter removal of them, followed by absorption of the rhenium on a suitable resin such as Amberlite IRA-400 alkyl amine resin, elution of the resin with ammonium thiocyanate NH$_4$SCN (U.S. Pat. No. 3,558,268) and finally crystallization of solid ammonium perrhenate NH$_4$ReO$_4$ as a solid, from which rhenium metal is readily recovered. Ammonium perrhenate is a stable, solid material, and can be shipped after recovery to another facility for recovery of the rhenium metal therefrom.

Thus the preferred process according to the disclosure comprises the steps of:
  preparing the oxidizing acid solution;
  adding the rhenium-containing material to the solution;
  collecting and treating the generated gases (mostly nitrogen oxides) to prevent release to the environment;
  processing the leach pulp so obtained through solid/liquid separation equipment; and
  processing the leach solution containing the perrhenic acid and other dissolved metals such as Ni and Cr in known manner to produce substantially pure ammonium perrhenate (APR). Treatment of APR with hydrogen yields rhenium metal.

As noted the preferred oxidizing acid solution is a nitric acid-hydrochloric acid aqueous mixture. Ratios of HCl/HNO$_3$ in the range 0.3 to 10 (v/v) are preferred. Most preferred are mixtures in which the hydrochloric acid constitutes the major proportion by volume. The rhenium containing material (super-alloy, metallurgical residue, ore etc.) is added to the oxidizing acid solution in a finely divided state, for best speed and efficiency of reaction, however, larger pieces of rhenium containing material may, in some exemplary embodiments, be utilized. The larger pieces of rhenium containing material, may for example be from about 2 inches to about 5 inches (about 5.0 cm to about 13 cm) in length and have an average cross-sectional dimension of about ½ of an inch (about 1.3 cm). For further clarity and in some embodiments, the larger pieces may have a size expressed in terms of volume wherein the larger pieces have a volume of about 20 cm$^3$ to about 100 cm$^3$. However it is preferable that the rhenium containing material particle size be in the approximate range of about 2 to about 300 microns, and more preferably in about the 20 to about 200 microns range. It is preferred to add the whole quantity of nitric acid oxidant at the start, and avoid having to replenish it during the reaction, since conditions where there are inadequate quantities of nitric acid present, and conversely excess quantities of hydrochloric acid, involve the risk of generation of hydrogen. The rate of addition of solids is arranged so as to control the heat released and to maintain an oxidizing redox potential of above 500 mv vs. Ag/AgCl and preferably above 750 mv. The reactions are exothermic, and so the rate of addition of solids should be arranged to prevent boiling of the acids and overflow of the liquids from the reaction vessel. Suitably a screw feeder can be used, with a speed control governed by the reaction temperature. The redox potential is monitored continuously or periodically, and can also be used to control the speed of addition.

The solids content during the leaching process may be from about 5% to about 20%. Preferably a solids content of 10% to 15% is used during the leaching process. In the exemplary embodiment noted above wherein large pieces of rhenium containing material are used in the leaching process, the temperature should be maintained, preferably, in the 40° C. to 80° C. range and the process typically is allowed to proceed for 2 to 10 days. In an exemplary embodiment using rhenium containing material in a finely divided state, the temperature should be maintained between from about 30° C. to about 80° C., however preferably the temperature should be maintained in the about 60° C. to about 80° C. range with the leaching process typically taking place over 1 to 6 hours. At the end of the leach, in the exemplary embodiments, the redox potential is preferably ≥750 mv (Ag/AgCl). Furthermore, the leaching process, in some exemplary embodiments may be conducted at atmospheric pressure.

The generated gases are collected and scrubbed chemically, according to known processes and using known apparatus, so as to minimize escape of generated nitric oxides to the environment. Possibly, oxygen, hydrogen peroxide or atmospheric air is added to the gas phase during leaching so as to react with the nitrogen oxides gases and regenerate part of the nitric acid in situ.

As noted, the process of the disclosure is applicable not only to recovery of rhenium values from alloys, but also to the recovery of rhenium from naturally occurring ores. Rhenium is found naturally in very small quantities as a component of copper ores and molybdenite ores. The molybdenum containing component of the copper ore (MoS$_2$) after separation of the copper, or the molybdenite concentrate, is roasted in oxygen at about 500° C., so that molybdenum remains in the solid phase as molybdic oxide, and other metal contaminants including rhenium compounds are vaporized. The gas contains vaporized Re$_2$O$_7$, which is separately recovered, and a dust containing rhenium, molybdenum and other residues. The gas is scrubbed to cause solid particles to be recovered from the gas stream as a dust. This contains some rhenium, and can be used as a metallurgical residue as a feed to the acid oxidation process of the disclosure. The remainder of the gas is treated with water, in which more rhenium is recovered in solution, to be separated by known processes.

The disclosure is further described, for illustrative purposes, in the following specific, non-limiting Examples.

Example 1

A super-alloy sample, in finely divided form of particle size up to about 100 microns, was assayed and found to have the following metal composition:
Rhenium 2.85%;
Nickel 53.6%;
Cobalt 9.9%;
Molybdenum 2.0%;
Aluminum 4.2%; and
Chromium 3.1%;
with the balance of the composition comprising Titanium (Ti), Tungsten (W) and Tantalum (Ta).

The finely divided material was added slowly to an agitated leach vessel containing acid solution, to a solids content of 100 kg/m$^3$ of solution. Five experiments were run, each at a temperature of about 70° C. to about 80° C. and over duration of about 4 to about 6 hours. In each experiment, the acid solution was hydrochloric acid, but also containing different amounts of nitric acid. The percentage of dissolved nickel and of dissolved rhenium was measured at the end of each experiment. The nitric acid contents, expressed as cubic meters per ton of feed (m$^3$/T), and analytical results are given in Table 1 below.

TABLE 1

| Test # | Nitric (70% Concentration) m$^3$/T of feed | HCl (12N) m$^3$/T of feed | % Ni-Dissolved | % Re-Dissolved |
|---|---|---|---|---|
| A(control) | 0 | 10 | 99.9 | 2.3 |
| B | 1.2 | 8.8 | 99.8 | 99.7 |

TABLE 1-continued

| Test # | Nitric (70% Concentration) m³/T of feed | HCl (12N) m³/T of feed | % Ni-Dissolved | % Re-Dissolved |
|---|---|---|---|---|
| C | 1.25 | 8.75 | 100 | 99.1 |
| D | 2.0 | 8.0 | 99.9 | 99.6 |
| E | 2.5 | 7.5 | 99.9 | 99.6 |

When no nitric is used (Control Test A), significant amounts of hydrogen are generated, and the Re extraction to the leach solution is only approximately 2.3%. However, when nitric is used in sufficient amounts, for example, tests B to E noted above, no hydrogen gas was detected and Re extractions were greater than 99%.

Example 2

Another series of similar experiments was conducted, using different starting materials. Each experiment used a leach time of about 5 hours, a temperature of about 70° C. to about 90° C., and a leach acid solution of about 1.8 to about 3.0 cubic meters of nitric acid per ton of feed. Feed type A was a nickel based super-alloy of North American origin. Feed type B was sludge from a molybdenite roasting of North American origin. Feed type C was sludge from a molybdenite roasting of European origin. Feed type D was a super-alloy from Europe. The feed types where assayed for the percent (%) composition of rhenium (Re), nickel (Ni), molybdenite (Mo) and cobalt (Co). The results of the percent compositional analysis of the feed types used are provided below in Table 2, and the results of the leach in Table 3. As feed types A and D were super-alloys, the balance of the composition for feed types A and D is comprised of tantalum (Ta), tungsten (W), and titanium (Ti). Feed types B and C were molybdenite-derived feeds and as such the balance of the composition was comprised of various other elements and compounds as well as other residues.

| Feed type | % Re | % Ni | % Mo | % Co |
|---|---|---|---|---|
| A | 1.62 | 63.22 | 2.73 | 7.54 |
| B | 1.76 | | 27.73 | |
| C | 3.26 | 0.01 | 9.31 | 0.02 |
| D | 1.65 | 57.2 | 1.71 | 8.79 |

| Feed type | Re extracted % | Ni extracted % | Co extracted % | Mo extracted % |
|---|---|---|---|---|
| A | 98.4 | 99.3 | 98.4 | 89.2 |
| B | 99.9 | | | 96.7 |
| C | 99.4 | | | 97.4 |
| D | 99.8 | 99.9 | 99.9 | 97.1 |

Example 3

A sample of Re-containing super-alloy from turbine blades was also subjected to the process in an experiment. The sample subjected to the process in this example was provided as a single, larger piece of material having a size of approximately 3 cm by approximately 10 cm with an average thickness or cross-sectional dimension of about 1.3 cm. The sample was assayed for percent composition and it was found to comprise 2.85% Re, 53.6% Ni, 9.9% Co, 3.1% Cr, 4.2% Al, and 2% Mo with the balance of the composition comprised of Ta, W and Ti.

The sample was subjected the leaching process, as described above, in a solution comprising hydrochloric and nitric acids (respectively 37% and 70% solutions by weight). The volume ratio of the acids was 3 (HCl) to 1 ($NO_3$) (3:1) and was provided in a volume of 10 liters per kilogram of the super-alloy blade sample (L/kg). The supernatant solution was agitated and kept at a temperature of about 80° C. The results of the amount of Re and Ni extracted by the process after a given number of days are provided below in Table 4.

TABLE 4

| Time Elapsed (Days) | g/L (extracted) | |
|---|---|---|
| | Re | Ni |
| 0 | 0 | 0 |
| 1 | 1.75 | 36.6 |
| 2 | 2.28 | 46.7 |
| 3 | 2.46 | 54.2 |
| 4 | 2.73 | 56.0 |

After four days of leaching, with the leaching solution maintained at 80° C., more than 99% of the rhenium and nickel where extracted into the solution.

The above noted results indicate that the leach process as described herein provide a process for the extraction of Re for all of the tested Re-containing feeds. It is contemplated that the process herein described may apply for the extraction of rhenium from other Re-containing compositions.

Those of skill in the art will recognize certain modifications, permutations, and additions to the process noted herein. While the process has been described for what are presently considered the exemplary embodiments, the disclosure is not so limited. To the contrary, the disclosure is intended to cover various modifications, equivalent steps and substitutions included within the spirit and scope of the appended claims. The scope of the following claims is to be accorded the broadest interpretation so as to encompass all such modifications and equivalent steps and substitutions.

What is claimed is:

1. A hydrometallurgical process of recovering rhenium values from a rhenium-containing super-alloy in the form of pieces having a volume of from about 20 cm³ to about 100 cm³, in which the rhenium values constitute a minority amount, the process comprising the steps of:
   a) subjecting the super-alloy to strongly oxidizing acid leaching conditions by contacting the super-alloy with a leaching composition comprising nitric acid and hydrochloric acid so as to form dissolved perrhenate species in an aqueous solution;
   b) removing insoluble metal species from the aqueous solution; and
   c) separating rhenium species from the aqueous solution.

2. The process as defined in claim 1, wherein the ratio of hydrochloric acid to nitric acid (v/v) in step a) is from about 1:3 to about 10:1, on a concentrated acid basis.

3. The process as defined in claim 1, wherein the hydrochloric acid constitutes a major portion of the leaching composition.

4. The process as defined in claim 1, wherein step (a) is conducted at temperatures of from about 40° C. to about 80° C.

5. The process as defined in claim 1, wherein step (a) is conducted over a period of time of from about 2 days to about 10 days.

6. The process as defined in claim 1, wherein the weight proportion of rhenium values and other metals in step (a) is from about 5% to about 20% (W/W).

7. The process as defined in claim 1, wherein at least step (a) is conducted at atmospheric pressure.

8. The process as defined in claim 1, wherein the rhenium species is separated from the aqueous solution by sulfide precipitation of $Re_2S_7$, by absorption on activated carbon, by absorption on absorbent resin, or by solvent extraction.

9. The process as defined in claim 1, wherein the rhenium species is separated from the aqueous solution as solid ammonium perrhenate $NH_4ReO_4$.

* * * * *